United States Patent
Panje et al.

(10) Patent No.: US 10,237,588 B2
(45) Date of Patent: Mar. 19, 2019

(54) DYNAMIC VIDEO DELIVERY FOR IN-HOME APPLICATIONS

(71) Applicant: ARRIS Enterprises LLC, Suwanee, GA (US)

(72) Inventors: Krishna Prasad Panje, Bangalore (IN); Praveen Girish, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/648,426

(22) Filed: Jul. 12, 2017

(65) Prior Publication Data

US 2019/0020910 A1    Jan. 17, 2019

(51) Int. Cl.
*H04N 7/173* (2011.01)
*H04N 21/2343* (2011.01)
*H04N 21/2225* (2011.01)
*H04N 21/234* (2011.01)

(52) U.S. Cl.
CPC . *H04N 21/234309* (2013.01); *H04N 21/2225* (2013.01); *H04N 21/23406* (2013.01)

(58) Field of Classification Search
CPC ....... H04N 21/234309; H04N 21/2225; H04N 21/23406
See application file for complete search history.

(56) References Cited

U.S. PATENT DOCUMENTS

| | | | | |
|---|---|---|---|---|
| 2011/0225315 | A1* | 9/2011 | Wexler | H04L 65/4076 709/231 |
| 2015/0256584 | A1* | 9/2015 | Sakaguchi | H04L 12/2812 709/219 |
| 2015/0341680 | A1* | 11/2015 | Sallas | H04N 21/2385 725/93 |
| 2016/0366202 | A1* | 12/2016 | Phillips | H04L 43/08 |

FOREIGN PATENT DOCUMENTS

EP    01/084336    11/2001

\* cited by examiner

*Primary Examiner* — John R Schnurr
(74) *Attorney, Agent, or Firm* — Carol J. Ansley

(57) ABSTRACT

Methods, systems, and computer readable media may be operable to provide dynamic transrating of video content within a DLNA network in the home. A gateway or other DLNA Digital Media Source providing a video stream in response to a user request from a Digital Media Player may determine that the video stream delivery may be close to failure based upon the behavior of the video server's transmit buffer. The gateway may direct an internal transrating resource to provide a lower bit rate content stream then advertise that new stream to the player.

14 Claims, 6 Drawing Sheets

600

DYNAMIC VIDEO DELIVERY FOR IN-HOME APPLICATIONS

TECHNICAL FIELD

This disclosure relates to dynamically transcoding video streams based on local conditions for in-home DLNA clients.

BACKGROUND

In response to consumer requests to be able to access video content seamlessly from a variety of different devices, the FCC mandated that operators provide a digital interface with an open format to allow consumers to access video content over their home networks. The Digital Living Network Alliance (DLNA) publishes a set of specifications that can be used to comply with the FCC's mandate. The DLNA specifications provide a means for consumer devices to identify interesting content, and request it over a home network. DLNA specifications define two basic types of devices, Digital Media Players (DMPs) and Digital Media Servers (DMSs). A DMP can discover and request content from a DMS. An example DMP is a laptop or mobile device. An example DMS is a set top box or media gateway.

In operation, a DMS publishes periodically a DLNA content directory though the DLNA Content Directory Service (CDS). Within a content directory is information about the programs available and their respective Universal Resource Indicators (URIs) that a DMP may use to retrieve content. From the directory, a DMP may request a specific piece of content by accessing the URI given in the directory. DLNA specifications do not provide for dynamic interactions between a DMS and a DMP. The content within a DLNA CDS is presented as is; a DMP cannot request a new item that is not currently on the CDS and also cannot request an alternate codec or bitrate. A DMP can only choose from the options provided by the CDS.

Home networks, where DLNA is typically used, are typically a combination of different technologies. Ethernet wired links may be combined with MoCA or G.hn wired links as well as with wireless technologies, such as Wi-Fi. The resulting network does not typically provide any guaranteed throughput or quality of service. Indeed, home networks often provide inconsistent bit rates over time in a connection between any two devices. While this is not a problem for many services, video services may be seriously affected if the bit rate available between two devices, such as a DMS and a DMP, drops below a given level. The end user may experience a frozen picture or macroblocking when the home network cannot accommodate the bit rate of the content streaming across it. Within the current DLNA architecture, no mechanisms are provided to detect or remedy video streaming issues due to home networking problems.

Therefore, a need exists for improved methods and systems for dynamic video delivery in home networks that can adjust to changing conditions within the home network.

SUMMARY OF INVENTION

Methods and apparatus to provide dynamic distribution of video to in-home clients are presented including: advertising a content to a Digital Media Player (DMP); receiving a request for the content from a DMP, the content having original content attributes associated with the content as provided to the home; providing requested content to the DMP through a transmit buffer associated with a Digital Media Server (DMS); monitoring the DMS's associated transmit buffer behavior; comparing the transmit buffer behavior to a threshold; and if the transmit buffer behavior meets the threshold, modifying the content to have new content attributes; and advertising the modified content to the DMP. The threshold mentioned may include a certain upper transmit buffer depth being present for a certain length of time. Modifying the content may include transrating the content to a bit rate lower than the bit rate of the original content attributes. The operation of transrating the content may also include transcoding the content. The transrated content may be advertised with a new Uniform Resource Indicator (URI) or with a Program Map Table (PMT) version update on the streamed content. In accordance with the new bit rate of the requested content stream a new threshold may be provided and the bit rate of the content stream may be adjusted further if the new threshold is met.

An apparatus is also disclosed that includes an interface configured to communicate with a DMP, wherein the communication includes at least Digital Living Network Alliance (DLNA) control messages and a content stream, an interface configured to receive content streams, one or more modules configured to transrate content streams, one or more modules configured to provide content streams in response to DMP requests, and one or more modules configured to control content distribution activity, The control module may compare the one or more attributes relating to transmit buffer behavior to a threshold, direct a transrating module to create a first transrated content stream if the one or more attributes relating to transmit buffer behavior meets the threshold; and advertise the first transrated content stream to the DMP. The interface used to communicate with a DMP may be Ethernet, IEEE 802.11, MoCA, G.hn, or Powerline.

Alternately, one or more non-transitory computer readable media may have instructions operable to cause one or more processors to advertise content in a Content Directory Service (CDS) to a DMP, receive a request for a content from a DMP, provide the requested content to the DMP from a DMS, monitor transmit buffer behavior in the DMS, compare transmit buffer behavior to a threshold; and if the transmit buffer behavior meets the threshold, transrate the requested content to a first transrated bit rate; then advertise the transrated content to the DLNA sink device.

The methods and apparatus described provide advantages to the in-home distribution of multimedia content over DLNA. A DMS without this invention can only offer content with the attributes provided by the broadband network. If a DMP requests content from a DMS but later has difficulties retrieving that content over the home network, the DLNA session may have intermittent problems or fail outright. With this invention, the bit rate may be smoothly adjusted to enable the session to continue with some decrease in video quality. Detecting when home network conditions have improved also allows the quality of the streaming session to improve without the user having to take action.

BRIEF DESCRIPTION OF THE DRAWINGS

Like reference numbers and designations in the various drawings indicate like elements.

DETAILED DESCRIPTION

It is desirable to improve upon methods and systems for dynamically transcoding video streams based on local conditions for the delivery of multimedia content to in-home DMPs using DLNA.

Figure 1:
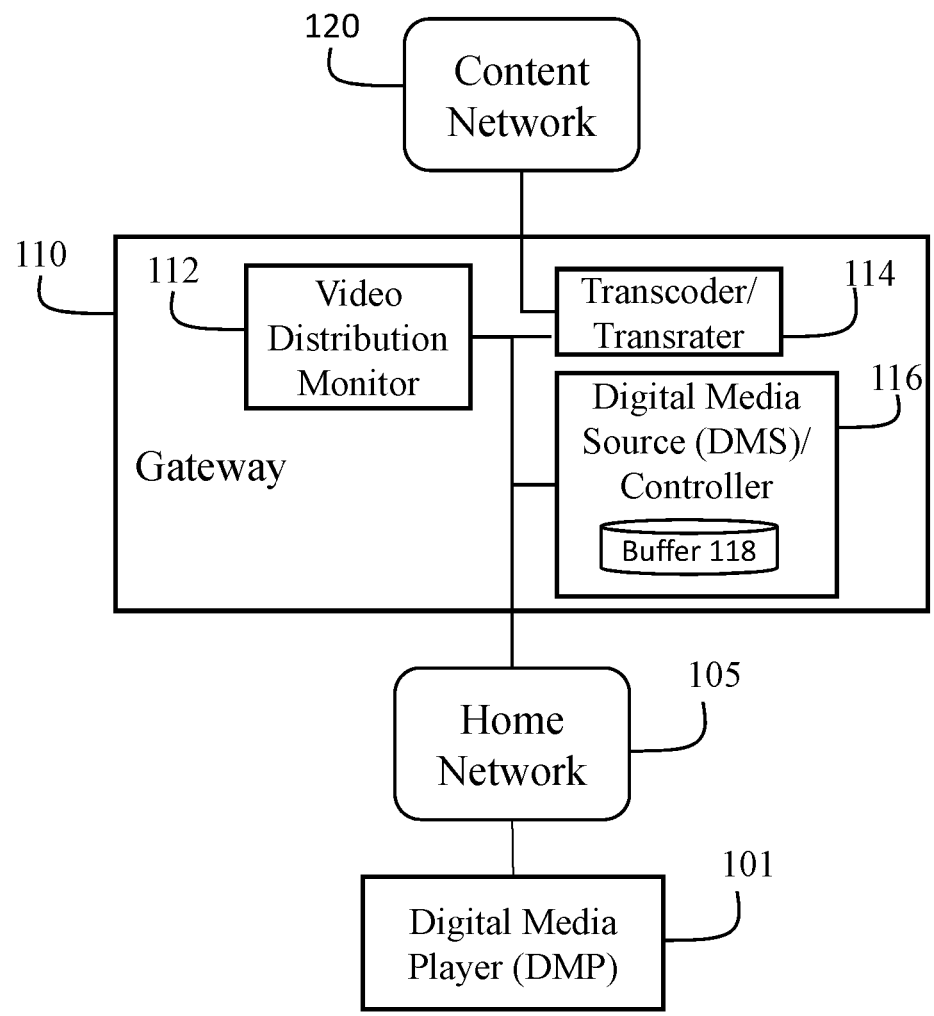
FIG. 1 is a block diagram illustrating an example network operable to improve the performance of in-home video delivery to a DMP.

FIG. 1 is a block diagram illustrating an example network 100 operable to dynamically transcode video streams based on local conditions for in-home DMPs. In embodiments, one or more customer premise equipment (CPE) devices (e.g., gateway 110, DMP 101, and other devices that are not shown) may operate together providing video and/or data services to a subscriber. A gateway 110 may include a connection to a content network 120. In embodiments, the connection to a content network could involve a broadband network, such as Fiber to the Premise (FTTP), Digital Subscriber Line (DSL) or Hybrid Fiber Coax (HFC), or a satellite connection, or other content network connections as are well known in the art. In embodiments, the content provided by content network 120 may be in a native IP fragmented format or it may be provided as an MPEG transport stream.

Within gateway 110, a DMS/controller 116 may provide DLNA content discovery and distribution services to the home network. DMS 116 may provide a CDS that specifies URIs for a DMP to access certain video content. The behavior of a DMS 116 is generally well known and is documented in the CVP-2 family of standards from the Digital Living Network Alliance. Within DMS 116 is a transmit buffer 118. The process of transmitting content over home network 105 is not instantaneous. Content requested from DMS 116 by DMP 101 will reside in transmit buffer 118 until it can be sent to the requester.

Within gateway 110, a transcoder/transrater 114 may be provided. It is well known to those skilled in the art that a transcoder 114 may provide transcoding services that transform a given piece of video content from one content format to another (e.g. from one encoded format to a second encoded format). The goal of a transcoding operation may be to provide content in a format acceptable to a specific type of device from a format that is generally provided by the content network 120. For example, a piece of content may be distributed in MPEG4 format, but may be transcoded to MPEG2 for a device that does not support MPEG4. A transcoding operation may also be performed to reduce the bit rate of a piece of content. For example, a piece of content in MPEG4 is typically smaller than a piece of content in MPEG2. A transcoder may also perform transrating operations, wherein a piece of content is kept in the same format, but its bit rate is reduced, typically at the cost of reduced picture resolution or quality.

Within gateway 110, a video distribution monitor 112 may support distribution of DLNA content. In embodiments, monitor 112 may communicate with DMS 116 to monitor the behavior of DLNA content distribution sessions. In embodiments, monitor 112 may also communicate with transcoder 114 to direct its operations.

While this example provides that functions 112, 114, and 166 are integrated within a gateway 110, one skilled in the art would understand that other divisions of functionality are possible. For example, transcoder 114 may be implemented in a separate device in the home alongside gateway 110. Alternatively, transcoder 114 might exist in content network 120, sometimes described as transcoding or transrating functionality being provided from the cloud.

A gateway 110 may communicate with a DMP 101 over a home network 105. In embodiments, home network 103 may include one or more networking technologies. The networking technologies may include any combinations of wired and wireless protocols, as mentioned earlier.

DMP 101 may retrieve a content directory from DMS 116. Based on the content directory, a user of DMP 101 may select a piece of content for display. DMP 101 may begin retrieving sections of content through home network 105 from DMS 116. In embodiments, monitor 112 may monitor the behavior of transmit buffer 118 on DMS 116 to ensure that DMP 101 is retrieving content at a rate consistent with acceptable video performance.

Figure 2:
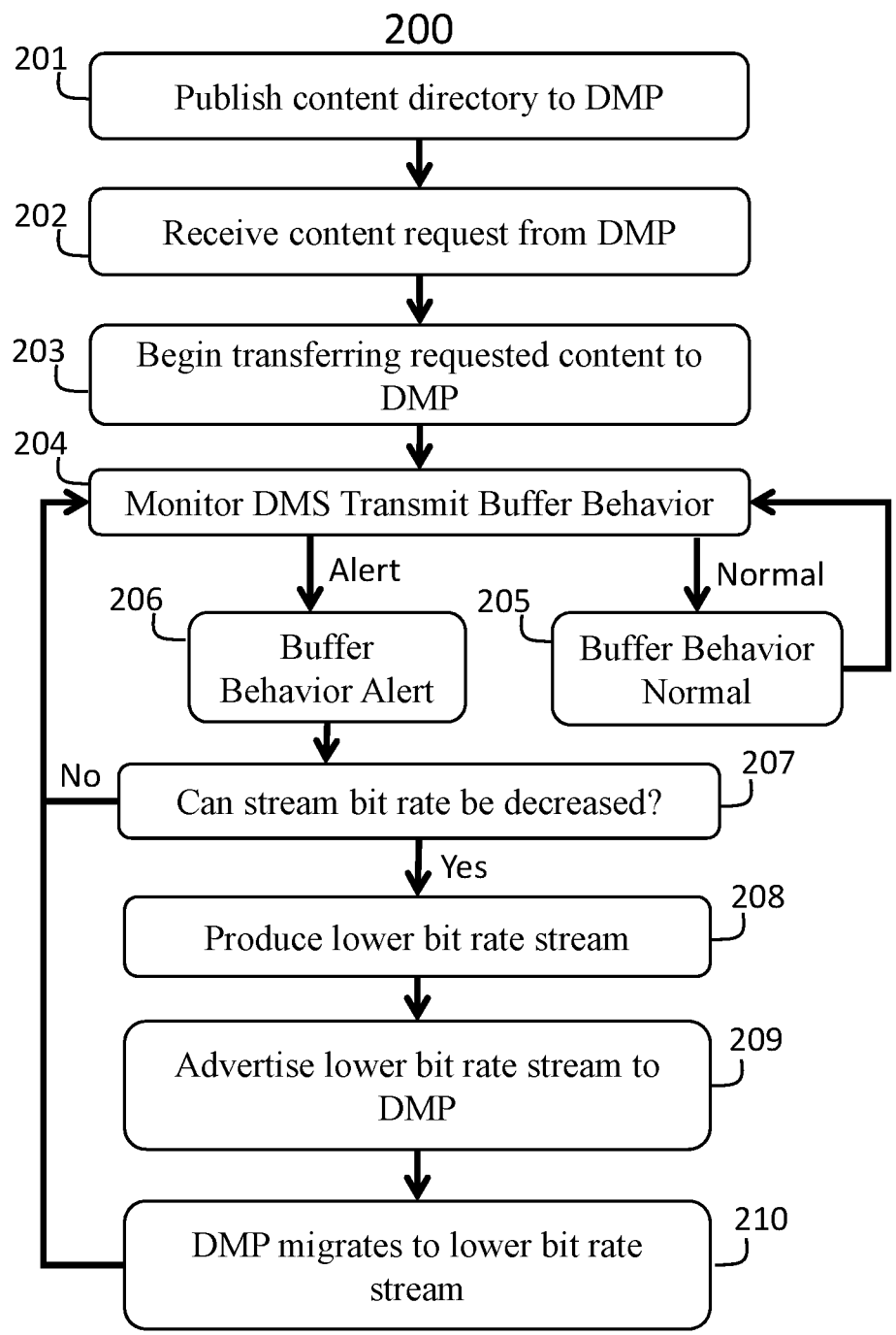
FIG. 2 is a flow chart illustrating an example process operable to provide improved content delivery to a DMP.

FIG. 2 is a flow chart 200 illustrating an example process operable to provide dynamic video streams based on local conditions for an in-home DMP 101.

In 201, a content directory is published to a DMP 101 by DMS 116. In embodiments, the publishing process may conform to DLNA CVP-2.

In 202, DMP 101 requests a specific piece of content. In embodiments, the player may request content from the DMS 116 using the URI address provided in the CDS from that server. A DMP typically requests content based upon an end user's selection, but may also request content based on other sources of direction, such as a DVR scheduler.

In 203, the content transmission process begins. In embodiments, the content served by DLNA is typically stored as fragmented MPEG2 or MPEG4 segments. Each segment may contain 2 to 10 seconds of content with an overall file size ranging from 1 Mb for 500 kb/s content in a 2 second fragment to 150 Mb for 15 Mb/s content in a 10 second fragment. When DMP 101 retrieves the content from a DMS 116, DMP 101 performs a series of HTTP GET commands, pulling each fragment across in a file transfer exchange.

Figure 4:
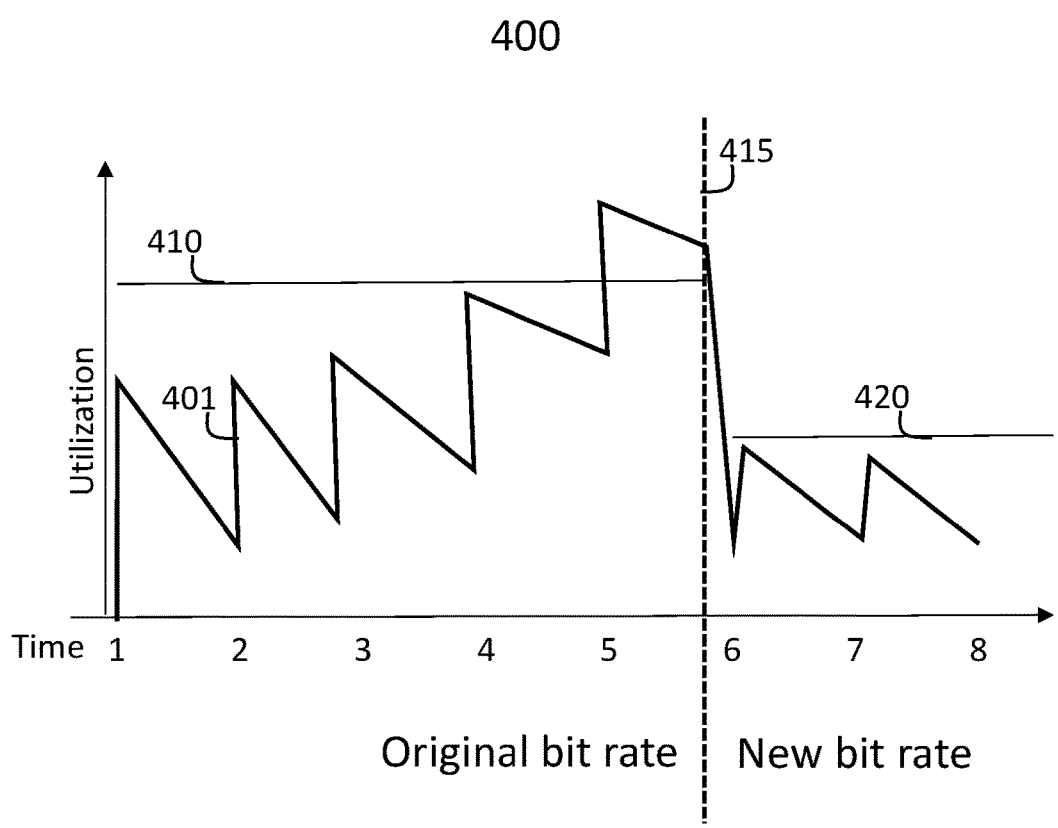
FIG. 4 is a graph illustrating an example of server buffer utilization in an embodiment of the present invention.

In 204, the behavior of DMS 116's transmit buffer 118 is monitored as DMP 101 periodically requests content. In embodiments, each HTTP GET command fills transmit buffer 118, and buffer 118 drains at a rate set by the bandwidth available on the home network between the DMS 116 and DMP 101. The link between DMS 116 and DMP 101 over the home network may vary in available bandwidth due to many factors such as variations in wireless transmission characteristics or the presence of other service flows on the network competing for bandwidth. FIG. 4, to be discussed later, contains an example of buffer behavior.

In embodiments, monitor 112 might periodically compare the amount of data in buffer 118 to a threshold set with reference to the bit rate of the content to ensure that data is not building up in buffer 118. For example, if the content represented 2 second fragments, monitor 112 could check the buffer depth every 2 seconds. If DMP 101 could not retrieve fragments over the home network 105 fast enough to keep up with the stream's bit rate, then the amount of data in buffer 118 will increase. In other embodiments, monitor 112's evaluation might compare a rate of change of the amount of data in buffer 118 to one or more thresholds, to ensure that buffer 118 is being emptied at least fast enough to keep up with the known data rate of the requested stream. In other embodiments, the two previous methods could be combined, so that the buffer fill level was compared against a threshold that decreased with time at a rate proportional to the desired bit rate of the video stream.

In 205, as long as the transmit buffer behavior is within normal limits, the process will continue monitoring transmit buffer 118 without taking other action.

In 206, if the transmit buffer behavior falls outside of the desired conditions expected by monitor 112, an alert may be generated. In embodiments, monitor 112 may generate an alert if the fill level in the buffer increases past a threshold level, where the threshold level may be set by the type of video stream or may be related to the type of DMP. In other embodiments, the buffer fill level that may generate an alert may be relative to the rate of decrease of the data within buffer 118. A slowing rate of decrease may indicate that the link between DMP and DMS is becoming congested. If the rate of decrease becomes slower than the playout rate of the video, the DMP's decode engine will fail for lack of data eventually. In embodiments, the behavior thresholds may be set to proactively detect issues before they would affect video playout. If the jitter buffer in a DMP holds 2-3 fragments, a monitor may assume that it may take action to move the DMP to a new stream before video problems are seen by the end user.

In 207, after detecting that the stream may be running at too high of a bit rate for the current network conditions, a determination is made as to whether it is possible to reduce the bit rate of the stream. In embodiments, the decision may be affected by many factors. If there is no available transcoding or transrating resource 114, then the content cannot be adjusted to reflect local network conditions. The transcoding or transrating resource 114 may already be engaged with other content, or the current encoding of the stream may not be compatible with the transcoding or transrating resources available. In embodiments, there may be a lower bound for the bit rate, which is well known to relate to overall video quality. Some content providers may specify that their content may not be reduced in bit rate below a certain bit rate to preserve their artistic vision, for example. Monitor 112 may have instructions or rules controlling whether or not action can be taken on any particular content. In any case where the bit rate of the stream cannot be decreased, the process returns to a monitoring state in 204. If the bit rate of the stream can be decreased, then the process continues to 208.

In 208, if the bit rate of the stream currently exhibiting transmit buffer behavior issues can be decreased, a resource 114 is allocated to produce a lower bit rate stream. In embodiments, the lower bit rate stream may be produced by a transcoding operation in which the new codec has a lower bit rate. In other embodiments, the lower bit rate stream may be produced by a transrating operation. If the monitor 112 has information about what codecs are acceptable to DMP 101, then transcoding and transrating operations may be considered. If monitor 112 does not have information about DMP 101's capabilities, then monitor 112 may only direct the content to be transrated.

In 209, the new lower bit rate content stream is advertised to DMP 101 by DMS 116 through a new entry in the CDS. In embodiments, the old content entry may be removed from the CDS to encourage DMP 101 to migrate to the new stream.

Alternatively, in another embodiment, the Program Map Table ("PMT") version of the transport stream may be updated indicating the new change in the program components. This change would alert DMP 101 to update its decoder and play the new stream without having to recognize and request a new CDS item.

In 210, DMP 101 begins using the new stream. In embodiments, transmit buffer 118 may be purged of older fragments that were still in the buffer, allowing the buffer to be reset. In other embodiments, the new fragments may be added to the older higher bit rate fragments already in buffer 118. In either case, the process returns to 204, monitoring the transmit buffer behavior for this stream.

Figure 3:
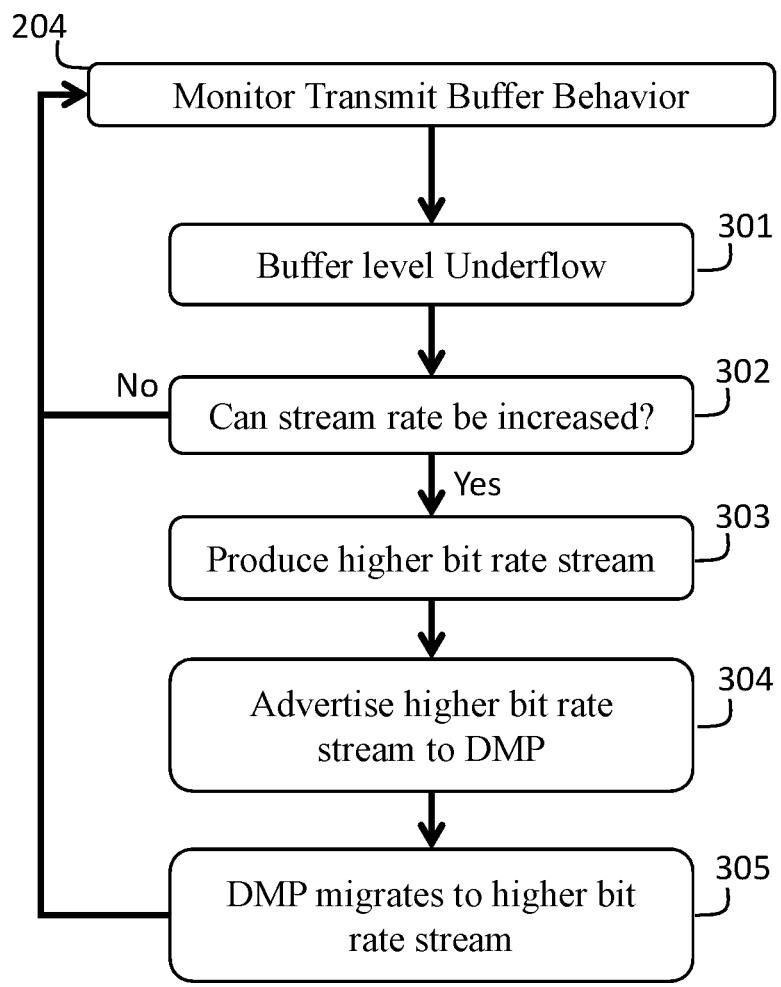
FIG. 3 is a flowchart illustrating an example process operable to extend the process described in FIG. 2.

FIG. 3 is a flowchart illustrating an example process 300 operable to extend process 200 described in FIG. 2. Process 300 may begin at 204 continuing from process 200 as discussed above. In 204, the current state of the transmit buffer is monitored as previously discussed.

In 301, an underflow of transmit buffer 118 is detected. In embodiments, the underflow might be detected when the amount of video in buffer 118 goes below a certain level for a certain period of time. For example, if DMP 101 is consuming 2 second fragments from buffer 118 in substantially less than 1 second, a higher bit rate stream could be supported to DMP 101 over the home network. Since a video stream's bit rate generally reflects the quality of the video displayed, detecting when a stream's bit rate is lower than what the network could optimally provide offers the ability to provide the end user with a better video experience if a higher bit rate alternative stream can be produced.

In 302, the process may continue with a determination whether it is possible to increase the bit rate of the stream. In embodiments, the possibilities for increasing the bit rate of a stream may be influenced by whether the current stream is the product of a transcoding or transrating operation. If the stream rate cannot be increased then the process returns to 204. If the stream rate can be increased then the process continues to 303.

In 303, a higher bit rate stream is produced. In embodiments, the higher bit rate stream may be produced by changing the transcoding or transrating configuration choices. In other embodiments, DMS 116 may return to the original source stream to provide a higher bit rate stream.

In 304, the higher bit rate stream is advertised to DMP 101. In embodiments, the new stream may be presented through a change to the CDS by DMS 116.

In 305, DMP 101 may migrate to the higher bit rate stream. After DMP 101 has migrated to the new stream, the process may return to 204 to monitor transmit buffer behavior. In embodiments, if DMP 101 has migrated to a higher bit rate stream, then the monitor thresholds may also be adjusted to account for the new bit rate.

FIG. 4 is a graph illustrating an example 400 of transmit buffer 118 behavior within DMS 116. Example 400 illustrates potential transmit buffer utilization or buffer depth from time T=1 to time T=8 with line 401. Lines 410 and 420 represent buffer thresholds. It is important to note that video delivery systems typically request multiple fragments, and usually request the fragments before they are actually required to allow time for their delivery.

This example begins at T=1, with DMP 101 requesting 2 fragments from DMS 116. At T=1, the arrival of 2 video fragments into buffer 118 is shown. Line 401 jumps up at T=1 once the fragments are loaded into buffer 118. Buffer 118 begins sending video toward DMP 101 and so the line slopes down as the buffer empties toward T=2. At T=2, DMP 101 requests another fragment to ensure timely delivery. Again, line 401 jumps up as the new fragment is added to buffer 118 and slowly drains toward T=3. At T=3, another fragment is added, but as home networking conditions between DMS 116 and DMP 101 begin to worsen the data remains in buffer 118 longer as shown by the slower rate of decrease in the buffer depth shown in line 410 between T=3 and T=4.

After the new fragments were added at T=4 and T=5, the amount of data in transmit buffer 118 has increased past line 410 due to continuing poor home networking conditions. The problems the server has supplying data to the DMP are reflected in the slower rate of decrease of data in the buffer. In embodiments, line 410 may have been set considering the bit rate of the video currently streaming or it may have been set by use of a default value.

At T=6, line 415 indicates the time of an example shift to a new lower bit rate video stream. As mentioned earlier, in embodiments, when moving to a new stream, transmit buffer 118 might be cleared or the fragments that were already loaded for delivery might be left in queue. In this example, line 401 at T=6 shows the transmit buffer cleared, then loaded with fragments from a new stream. A new threshold shown by line 420 is also shown. In embodiments, as mentioned earlier, a new threshold may be set to account for the lower bit rate feeding the transmit buffer. In other embodiments, the threshold level may remain unchanged.

The stream used after T=6 has a lower bit rate, as shown by the smaller peaks after T=6. The playout rate shown by the sloping line from T=6 to T=7 still has a shallower slope than the original line segments, indicating that the causes of the network delivery issues are still present.

Figure 5:
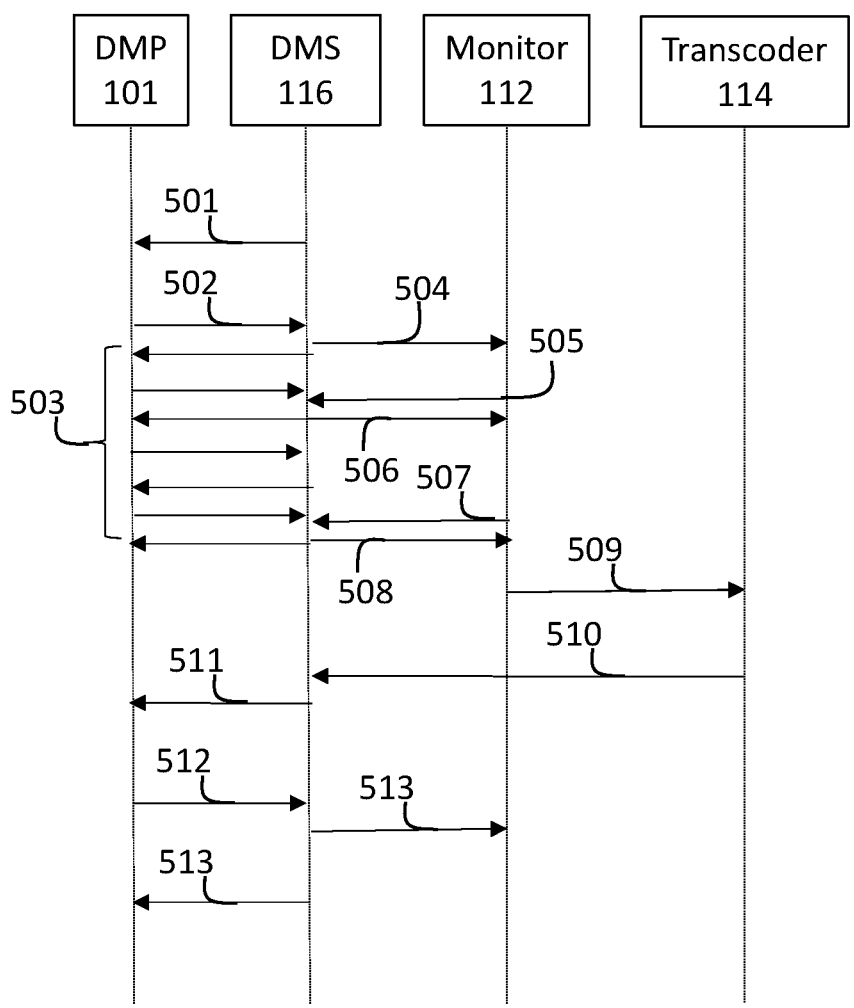
FIG. 5 is a message flow diagram illustrating an example process operable to provide improved content delivery to a DMP.

FIG. 5 is a message flow diagram 500 illustrating an example process operable to dynamically transcode video streams based on local conditions for in-home DLNA clients.

Message 501 from DMS 116 is sent to DMP 101 advertising the content available from DMS 116. In embodiments, the message may advertise the CDS available from DMS 116.

Message 502 is sent from DMP 101 to DMS 116 to request the content. In embodiments, the DMS 116 may host the URI used for the DMP 101's request. In other embodiments, different servers might provide the CDS and host the URIs. In embodiments, message 502 may be an HTTP GET message that requests a single fragment file.

In response to message 502, DMS 116 provides the requested content to DMP 101 through a series of transactions collectively labelled 503. For at least each fragment, the DMP 101 sends a request to the DMS 116, and the DMS 116 replies with the requested content.

DMS 116 alerts monitor 112 that a streaming session is active with message 504. In embodiments, message 504 may include the requesting device and the specific piece of content chosen, among other information.

Monitor 112 sends a query message 505 to check the behavior of the transmit buffer 118 in DMS 116. In embodiments, monitor 112 may send a query message like message 505 at periodic intervals. The intervals may be set by a variety of factors including but not limited to the bit rate of the stream, the number of simultaneous sessions monitor 112 is tracking, and knowledge of the network connections used by DMP 101.

DMS 116 sends a message 506 back to the monitor task in response to message 505. Message 506 may comprise information about the current state of transmit buffer 118 in DMS 116. In embodiments, DMS 116 may send further responses periodically to monitor 112, or it may wait and respond to further queries from monitor 112.

In this example, DMS 116 receives another query message 507 from monitor 112 checking on transmit buffer 118's behavior. DMS 116 replies in message 508 with an update on buffer 118's status. In embodiments, the message 508 may contain an actual byte count of information in buffer 118 for monitor 112 to evaluate or it may indicate that buffer 118's behavior has met a certain threshold. In other embodiments, the message may indicate a rate of change for buffer 118. In other embodiments, DMS 116 may process the buffer status information to indicate to monitor 112 that a threshold has been crossed.

After receiving message 508 from DMS 116, monitor 112 determines that a lower bit rate video stream is needed. Monitor 112 sends message 509 to transcoder 114 to request a reduced bit rate stream for DMP 101 to be delivered to DMS 116. In embodiments, monitor 112 may instruct transcoder 114 to produce a stream with a specific bit rate, or it may select a bit rate from a menu of transcoder options.

With message 510, transcoder 114 sends the new lower bit rate stream to DMS 116. While this transaction is shown as a single message, embodiments of this transaction may incorporate multiple transactions. These transactions are simplified here since video file transfers are well known in the art.

Once DMS 116 has access to the lower bit rate stream from transcoder 114, DMS 116 may advertise it to DMP 101 in message 511. DMP 101 may request the new lower bit rate stream with message 512. The server may again notify the monitor 112 of the new stream playout to DMP 101 with message 513, and begin delivering the new stream to DMP 101 with message 514.

Figure 6:
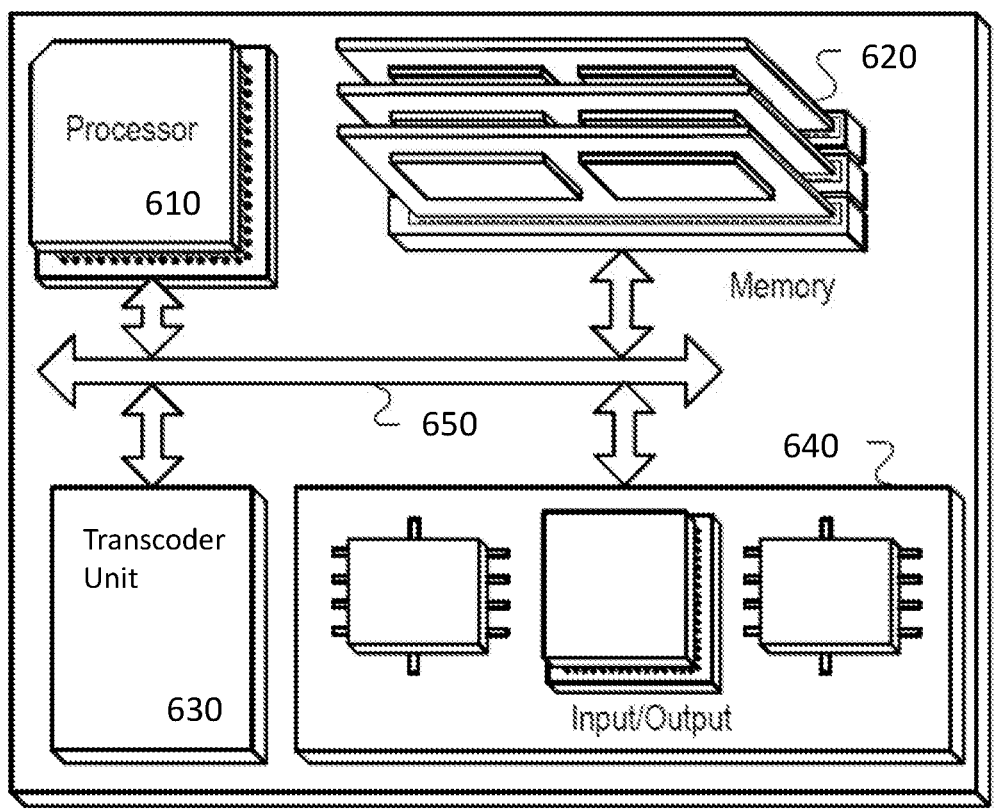
FIG. 6 is a block diagram illustrating an example hardware platform operable to dynamically transcode video streams based on local conditions for in-home DMPs.

FIG. 6 is a block diagram of a hardware configuration 600 operable to dynamically transcode video streams based on local conditions for in-home DLNA clients. The hardware configuration 600 may include a processor 610, a memory 620, a transcoder unit 630, and an input/output device 640. Each of the components 610, 620, 630, and 640 may, for example, be interconnected using a system bus 650. Processor 610 may be capable of processing instructions for execution within hardware configuration 600. In one implementation, processor 610 may be a single-threaded processor. In another implementation, processor 610 may be a multi-threaded processor. Processor 610 may be capable of processing instructions stored in memory 620.

Memory 620 may store information within hardware configuration 600. In one implementation, memory 620 may be a computer-readable medium. In one implementation, memory 620 may be a volatile memory unit. In another implementation, memory 620 may be a non-volatile memory unit. In yet another implementation, memory 620 could be a combination of both volatile and non-volatile memories.

In some implementations, transcoder unit 630 may be capable of providing video and audio transcoding for hardware configuration 600. In one implementation, the transcoder unit may be capable of providing transrating capabilities for hardware configuration 600 as well as transcoding. In various different implementations, transcoder unit 630 may, for example, comprise a single chip transcoder implementation. In other implementations, transcoder unit 630 may be a multi-chip module. In still other implementations, transcoder unit 630 may be integrated within processor 610.

Input/output device 640 provides input/output operations for hardware configuration 600. In one implementation, input/output device 640 may include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 interface), and/or one or more interfaces for outputting video and/or data services to a CPE device (e.g., DMP 101 of FIG. 1, cable set top box, tablet, wireless extender, or other client device). In another implementation, input/output device 640 may include driver devices configured to send communications to, and receive communications from one or more networks (e.g., home network 105 of FIG. 1, content network 120 of FIG. 1, etc.).

Those skilled in the art will appreciate that the invention described herein improves upon methods and systems for providing reliable video to a DMP. The subject matter of this disclosure, and components thereof, may be realized by instructions that upon execution cause one or more processing devices to carry out the processes and functions described above. Such instructions may, for example, comprise interpreted instructions, such as script instructions, e.g., JavaScript or ECMAScript instructions, or executable code, or other instructions stored in a computer readable medium.

Implementations of the subject matter and the functional operations described in this specification may be provided in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a tangible program carrier for execution by, or to control the operation of, data processing apparatus.

A computer program (also known as a program, software, software application, script, or code) may be written in any form of programming language, including compiled or interpreted languages, or declarative or procedural languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows may also be performed by, and apparatus may also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory may be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter described in this specification have been described. Other embodiments are within the scope of the following claims. For example, the actions recited in the claims may be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method of dynamic distribution of content to in-home clients,
   comprising:
   advertising a content to a Digital Media Player (DMP);
   receiving a request for the content from a DMP, the content having original content attributes associated with the content as provided to the home;
   providing requested content to the DMP through a transmit buffer associated with a Digital Media Server (DMS);
   monitoring the DMS's associated transmit buffer behavior;
   comparing the transmit buffer behavior to a threshold; and
   if the transmit buffer behavior meets the threshold:
      modifying the content to have new content attributes; and
      advertising the modified content to the DMP with a Program Map Table (PMT) version update in the currently streamed content.

2. The method of claim 1, wherein: the threshold comprises a certain upper transmit buffer depth being present for a certain length of time, and modifying the content comprises transrating the content to a bit rate lower than the bit rate of the original content attributes.

3. The method of claim 2, wherein transrating the content also comprises transcoding the content.

4. The method of claim 1 further comprising, providing a new threshold in accordance with the current bit rate of the requested content stream.

5. The method of claim 4, further comprising:
if the transmit buffer behavior with the first transrated bit rate content continues to meet the new threshold:
transrating the requested content to a second transcoded bit rate, and
advertising the second transcoded bit rate content to the DMP by a PMT version update in the streamed content.

6. An apparatus comprising:
an interface configured to communicate with a DMP, wherein the communication includes at least Digital Living Network Alliance (DLNA) control messages and a content stream;
an interface configured to receive content streams;
one or more modules configured to transrate content streams;
one or more modules configured to provide content streams in response to DMP requests;
one or more modules configured to control content distribution activity, wherein the module is configured to:
compare the one or more attributes relating to transmit buffer behavior to a threshold;
direct a transrating module to create a first transrated content stream if the one or more attributes relating to transmit buffer behavior meets the threshold; and
advertise the first transrated content stream to the DMP by a PMT version update in the streamed content.

7. The apparatus of claim 6, wherein the interface configured to communicate with a DMP is one of: Ethernet, IEEE 802.11, MoCA, G.hn, Powerline.

8. The apparatus of claim 6, further comprising, adjusting the threshold in accordance with the first transrated content stream.

9. The apparatus of claim 8, with the one or more modules configured to control content distribution activity further comprising:
direct a transrating module to transrate the requested content stream to a second transcoded bit rate, if the transmit buffer behavior with the first transrated content stream meets the adjusted threshold; and
advertise the second transrated content stream to the DMP by a PMT version update in the streamed content.

10. The apparatus of claim 6, wherein transrating also comprises transcoding the requested content.

11. One or more non-transitory computer readable media having instructions operable to cause one or more processors to perform the operations comprising:
advertise content in a Content Directory Service (CDS) to a DMP;
receive a request for a content from a DMP;
provide the requested content to the DMP from a DMS;
monitor transmit buffer behavior in the DMS;
compare transmit buffer behavior to a threshold; and
if the transmit buffer behavior meets the threshold:
transrate the requested content to a first transrated bit rate; and
advertise the transrated content to the DLNA sink device by a PMT version update in the streamed content.

12. The one or more non-transitory computer readable media of claim 11, further comprising, adjusting the threshold in accordance with the first transrated bit rate.

13. The one or more non-transitory computer readable media of claim 12, further comprising:
if the transmit buffer behavior with the first transrated content continues to meet the adjusted threshold,
transrate the content to a second transcoded bit rate; and
advertise the second transcoded content to the DMP by a PMT version update in the streamed content.

14. The one or more non-transitory computer readable media of claim 11, wherein transrating also comprises transcoding the requested content.

* * * * *